United States Patent [19]

Fond

[11] Patent Number: 5,165,706
[45] Date of Patent: Nov. 24, 1992

[54] SELF-ELEVATING BOAT LAUNCHING AND DOCKING GUIDE RAIL FOR TRAILERS

[76] Inventor: Ben Fond, General Delivery, Theodosia, Mo. 65761

[21] Appl. No.: 493,882

[22] Filed: Mar. 15, 1990

[51] Int. Cl.⁵ .............................................. B60P 1/00
[52] U.S. Cl. ................... 280/414.1; 414/482; 280/40
[58] Field of Search ............... 280/414.1, 414.3, 414.2, 280/47.331, 401; 414/482, 483; 114/344

[56] References Cited

U.S. PATENT DOCUMENTS

| | | |
|---|---|---|
| 804,155 | 11/1905 | Morse . |
| 2,585,664 | 2/1952 | Le May ..................... 280/414.1 X |
| 2,711,259 | 6/1955 | Jones .............................. 214/506 |
| 2,823,817 | 2/1958 | Holsclaw ................. 280/414.1 X |
| 3,130,842 | 4/1964 | Melloni ............................ 214/84 |
| 3,339,217 | 9/1967 | Gudmundson ....................... 9/1 |
| 3,365,733 | 1/1968 | Gudmundson ....................... 9/1 |
| 4,099,279 | 7/1978 | Park ............................ 114/344 |
| 4,223,414 | 9/1980 | Dickson ............................. 9/1.5 |
| 4,242,768 | 1/1981 | Winsett .......................... 114/344 |
| 4,395,185 | 7/1988 | Whaley ............................ 414/483 |
| 4,659,100 | 4/1987 | Welker .......................... 280/414.1 |
| 4,684,145 | 8/1987 | Tingleg ......................... 114/344 |
| 4,754,988 | 7/1988 | Hofgren ........................ 280/414.1 |
| 4,765,794 | 8/1988 | Stephens et al. ............ 280/414.1 X |
| 4,946,332 | 6/1990 | Daniels .......................... 280/414.1 |
| 4,955,778 | 9/1990 | Godbersen ................... 414/482 X |

Primary Examiner—Andres Kashnikow
Assistant Examiner—Richard Camby
Attorney, Agent, or Firm—Heller & Kepler

[57] ABSTRACT

A self-elevating boat launching and docking guide rail for use in association with a boat trailer for assisting in the loading and unloading of a boat has a guide rail in the general shape of the boat and raises or lowers independent of the trailer with a gas charged cylinder. The boat guide attaches to the boat trailer by replacing the existing winch stand with a winch stand in accordance with the present invention. The guide rails and elevating device attach to the winch stand.

16 Claims, 6 Drawing Sheets

SELF-ELEVATING BOAT LAUNCHING AND DOCKING GUIDE RAIL FOR TRAILERS

BACKGROUND OF THE INVENTION

The present invention relates in general to a boat launching and docking guide and pertains, more particularly, to a self-elevating boat launching and docking guide rail for trailers directed to assisting in loading and unloading the boat from the trailer. The boat lauching and docking guide rail of this invention is an improvement over conventional guide rails associated with boat trailer assemblies.

With the conventional boat guides it is generally necessary to back a boat trailer down an incline or ramp. As the boat and trailer enter the water the stern of the boat floats free from the trailer. The bow of the boat is launched from the trailer and the boat is free of the trailer and afloat. The boat is loaded onto conventional trailers by reversing these steps. These conventional trailers are typically rigid structures including a central longitudinal member with either rollers or pads to guide and hold the boat in place on the trailer.

Conventional boat trailers generally do not provide effective assistance for loading and unloading the boat. Another drawback associated with the conventional boat trailer is that whenever there are winds present, other boat traffic, currents or other conditions that cause the boat's stern to drift from center when loading and unloading the boat, these conditions are likely to damage a boat's hull either by forcibly withdrawing the bow while the stern is afloat, or by the boat hull settling unevenly into the trailer as the trailer is withdrawn from the water.

Existing boat trailers also have a drawback in that a single operator must perform all the functions of aligning the boat to the trailer, attaching the boat to the trailer as the boat floats above the trailer, and driving a vehicle to pull the boat and trailer out of the water.

Examples of conventional trailers are disclosed in the following U.S. patents. The Whaley reference, U.S. Pat. No. 4,395,185, discloses a self leveling boat trailer having a boat support platform with a floatation device. The floating platform remains level with the water which improves the boat loading and unloading capabilites.

The Gudmundson references, U.S. Pat. Nos. 3,365,733 and 3,339,217 disclose a boat trailer with a housing, and the housing containing a floatable material for floating the trailer when immersed. The disclosed trailer also provides a dry dock for the boat and a walkway for the people using the trailer.

Accordingly, it is an object of the present invention to provide an improved self-elevating boat launching and docking guide rail that is attached to the trailer but can be raised and lowered independent of the trailer.

Another object of the present invention is to provide an improved self-elevating boat launching and docking guide rail that is constructed to provide a boat guide that raises above, yet not out of the water when the trailer is backed into the water, and lowers when the trailer and boat are pulled from the water by a vehicle.

A further object of the present invention is to provide an improved self-elevating boat launching and docking guide rail that is adapted to provide alignment of the boat with the trailer and prevent the stern of the boat from drifting during the loading and unloading procedure.

Still another object of the present invention is to provide an improved self-elevating boat launching and docking guide rail that will be of assistance to a single person faced with the task of either loading or unloading a boat from a trailer.

Still a further object of the present invention is to provide an improved self-elevating boat launching and docking guide rail that is capable of being adapted for use in association with conventional boat trailers.

Another object of the present invention is to provide a self-elevating boat launching and docking guide rail that may be provided in the general shape of a boat and that can be mounted on suitable conventional boat trailers by replacing an existing winch stand with a modified winch stand constructed in accordance with this invention.

SUMMARY OF THE INVENTION

To accomplish the foregoiong and other objects of this invention there is provided a self-elevating boat launching and docking guide rail for supporting a boat during launching and docking of the boat in association with a trailer adapted for use in accordance with the present invention. The self-elevating boat launching and docking guide rail comprises a guide rail and elevating apparatus having a means for defining an enclosure for receiving a boat during a launching or a docking maneuver.

The enclosing means provides alignment means for the boat and a trailer. An elevating means associated with the enclosure portion elevates this enclosure by a number of preferred methods. A mounting arrangement is provided for mounting the combination of the present invention on a conventional boat trailer.

In operation, with the weight of the boat resting on a launching and docking support roller, attached to guide rails at a stern or rear of a trailer, guide rails constructed in accordance with the present invention will remain in a lower or down position on the trailer and around a bow or front and sides of the boat. In a preferred emobidment the guide rails are positioned approximately half way up sides of the boat or otherwise intermediate the bottom or keel of the boat and the sides or gunwales.

As the trailer is backed into the water the buoyancy of the boat removes the weight of the boat off the roller. As described an elevating means may be provided by a gas charged cylinder for elevating the guide rail and thereby maintaining the support roller (or rollers) in contact with the boat keel. In this manner the boat is maintained in a desired position by the guide rails until the boat is backed out of the guide rails.

Accommodations may be made for locking the guide rails so as to allow the boat to drift free of the trailer and guide rail combination as the trailer and guide rails submerge together.

The boat docking steps are approximately a reverse of the steps previously described for boat launching. The guide rails are unlocked and the elevating means, such as the gas charged cylinder, slowly raises the stern portion of the guide rails. In a preferred embodiment of the present invention the stern is raised approximately 20° from the frame portion of the trailer. It will be further understood from the following description that the degree of elevation is adjustable.

The trailer is backed into water and the rear of the trailer frame submerges while the elevated guide rails remain above the water line. The boat is docked between the elevated guide rails and the keel of the boat contacts the submerged support roller. The sides of the boat may come into contact with the elevated guide rails during the docking maneuver. Finally, the bow of the boat is secured to the trailer in a conventional manner.

The weight of the boat on the loading roller lowers the guide rails and overcomes the elevating means, or as in the case of the embodiment illustrated herein, compresses the gas charged cylinder. Finally, as the trailer is pulled out of the water, the guide rails, support roller, and the boat lower such that the boat lowers in registration or alignment with the trailer. Thus, the boat lowers onto the trailer's conventional boat supports. The boat is now ready for transport once it is secured to the trailer.

These and other objects and features of the present invention will be better understood and appreciated from the following detailed description of one embodiment thereof, selected for purposes of illustration and shown in the accompanying drawings.

DETAILED DESCRIPTION

Referring now to the drawings there is shown a preferred embodiment for the self-elevating boat guide rail of this invention for trailers. The self-elevating boat guide rail is described in connection with a boat trailer application for launching, docking, and trailering a boat. The self-elevating boat guide rail of the present invention is particularly adapted for providing for vertical movement of the boat guide while limiting any horizontal movement.

The drawings show a trailer and guide rail combination 10 in conjunction with a pulling vehicle 12 equipped with a suitable trailer hitch arrangement (not shown on the vehicle). The trailer and guide rail combination 10 comprises a boat guiding means that includes a guide rail and elevating means that includes an elevating mechanism. The combination is indicated by reference character 14. A guide rail portion 16 is provided generally in the shape of a trailered boat 50.

It will be understood that the overall shape or configuration of the guide rails may vary to suit a particular model or style of boat. The outer shape or configuration of the guide rail should be chosen to suit the boat and provide for receiving and holding the boat 50 in place during launching and docking. In one preferred embodiment the guide rail portion 16 is an aluminum tubing having a suitable strength and providing a lightweight yet strong and sturdy structure.

Transverse supporting means are provided to receive the bottom of the boat 50 during the launching and docking operation. The transverse support provides additional strength for the guide rail structure. The transverse support member may be arched in a preferred embodiment. In the illustrated embodiment a transverse support member 18 carries a launching and docking roller 20 for launching and docking and is preferably located between the open ends of the guide rail portion 16.

In the illustrated embodiment the launching and docking roller 20 is mounted on the arched transverse support member 18. It is suggested that the arch conform to the general shape of the bottom of the stern portion of the boat 50. The transverse support member 18 is preferably attached near the open end of the guide rail portions 16 and spans the gap intermediate the opposing guide rails. The transverse support member 18 further provides a tension member for substantially preventing the opposing guide rails from spreading apart during launching and docking the boat 50.

The illustrated embodiment shows the guide rail portion 16 covered with a cushioning and protecting means as will be further described hereinafter. In the illustrated embodiment a protective cover member 22 provides a desired cushion between the guide rail portion 16 and the boat 50. Typically, the cushion can be made of a polyethylene material or an equivalent. Furthermore, the desired material is water resistant.

The cover member 22 may extend the length and width of the boat receiving portion of the guide rails. In this embodiment the cover also provides protection between the boat and the conventional trailer members that support the boat.

The protective member may be draped from the guide rails. In this embodiment the cover 22 will also act to protect the bottom of the boat as it is trailered. Furthermore, the cover 22 should hinder or prevent debris from floating into the launching and docking boat receiving portion intermediate the guide rails when the trailer is in the water.

Mounting means are provided for attaching the guide rail portion 16 to a conventional boat trailer 52. In a preferred embodiment the mounting means includes a mounting bracket 24 that may further include winch mounting means in the form of a preferred winch mounting base 26. The mounting bracket 24 is illustrated as attached to a bow or forward end of the guide rail portion 16.

Pivot means are provided in association with mounting means for allowing the guide rail portion to pivot during the launching and docking maneuvers contemplated by the present invention. The mounting bracket defines a pivot pin support bore 28 and an elevating cylinder support bore 30. The pivot means provides for a pivot mount associated with the boat guide rail portion 16 of the boat trailer and guide rail combination.

The pivot pin support bore 28 provides a preferred means for attaching the guide rail portion 16 to the trailer 52. The elevating cylinder support bore 30 is located generally intermediate the pivot pin support bore 28 and the general attachment location of the guide rail portion 16 to the mounting bracket 24.

The present invention provides for a winch stand 26 that is intended to replace an existing conventional winch stand on the boat trailer 52. The winch mounting base provides for attachment of the guide rail and elevating mechanism 14. The attachment is accomplished in a preferred embodiment with a guide rail pivot pin 32 located in the support bore 28.

Elevating means mounting bores are provided as indicated by reference character 40. The elevating means will be mounted with pins or fasteners suitable for the particular elevating device chosen.

The illustrated elevating means is provided by a pressurized cylinder device 34. The elevating or lifting means raises the boat launching and docking guide rail 16. The elevating means or lifting device 34 attaches to a lower portion of the modified winch mounting base 26 and preferably to the mounting hole indicated by reference character 30 on the mounting bracket 24. It will be understood that the size, type and elevating ability of the lifting device 34 depends upon the weight of the guide rail 16.

Figure 6:
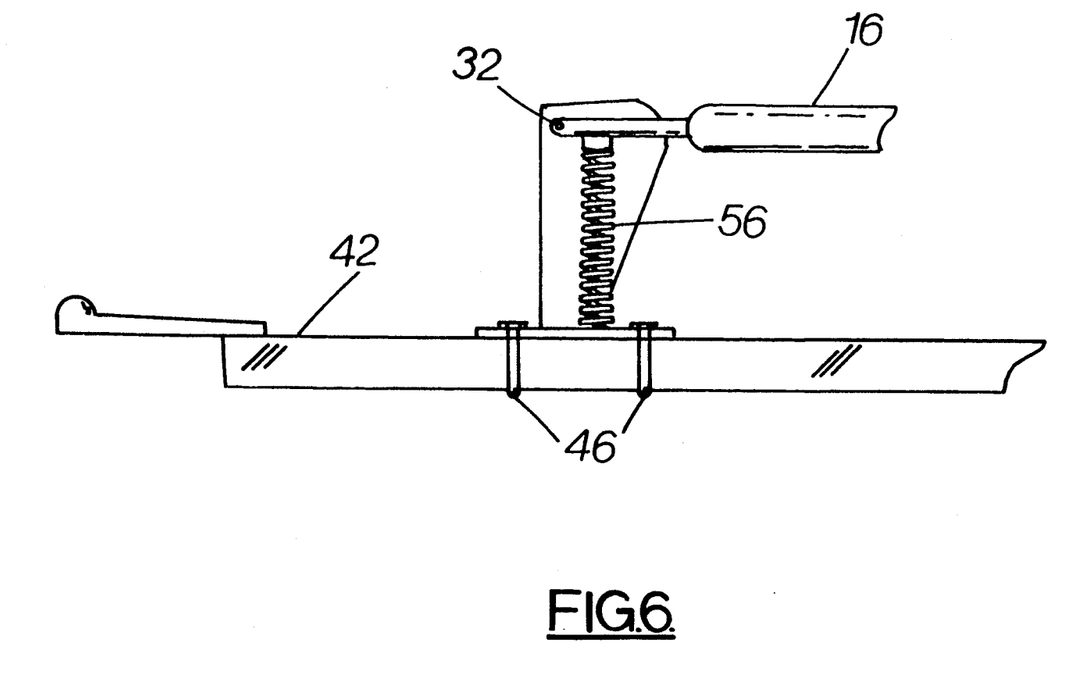
FIG. 6 is another exposed side view depicting another embodiment of the elevating device of the present invention.

Another embodiment of the elevating means is depicted schematically in FIG. 6 and includes a bias means for providing the desired elevating of the guide rail 16. The bias means illustrated is a coil spring 56. It will be understood that the spring is preferably sized to lift the guide rail 16 but not the boat. The spring sizing should also take into account that in a preferred embodiment the elevating or lifting capability of the spring may be overcome manually.

The disclosed elevating means is a gas charged cylinder, a coil spring, a motor driven screw, or a manually operated drive. It will now be understood that other elevating means may also be provided with appropriate modifications to the described or illustrated embodiments of the present invention. As an example, it should now be realized that a leaf spring arrangement may also be adapted to provide the desired elevating force.

The connections between these elevating means and the mounting bracket 24 need not be described in detail since it will be understood by one skilled in the art to provide the necessary and standard connections that allow the guide rail to be elevated about the pivot point.

The elevating or lifting device 34 should have the capacity to elevate the guide rail 16 from a lower position to a raised or partially raised position. The elevating means will also be capable of elevating the guide rail 16 even when the guide rail is being raised from a submerged position. A particular elevating means, lifting device, or gas-charged cylinder will provide the desired elevation of the guide rail in order to maintain the guide rail, or the supporting roller, in contact with the bottom of the boat.

Figure 1:
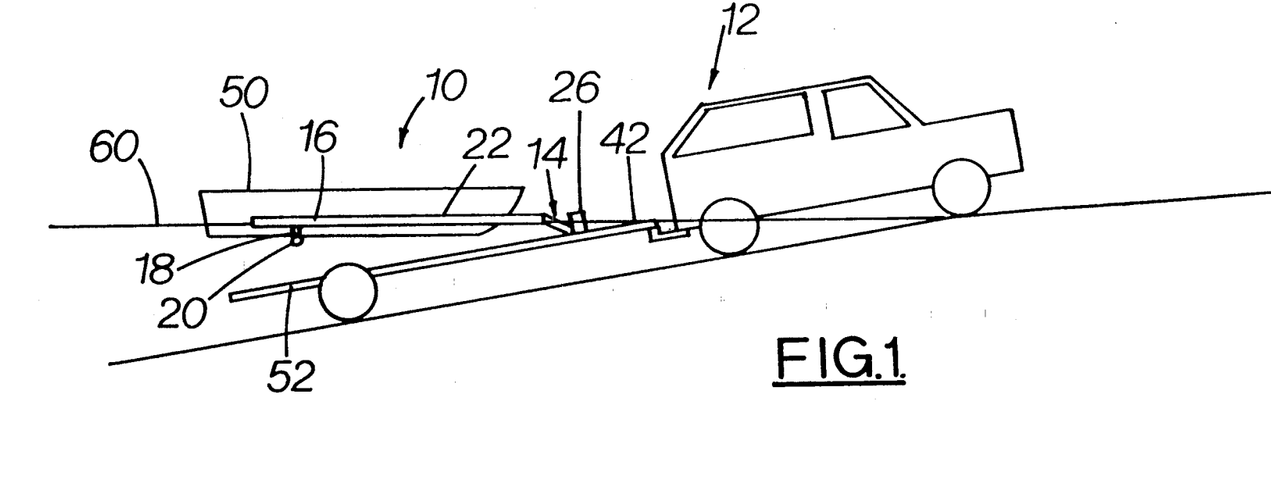
FIG. 1 is schematic representation of a self-elevating boat launching and docking guide rail and trailer combination hitched to a pulling vehicle in the process of either launching or docking a boat with the trailer of the present invention.
Figure 2:
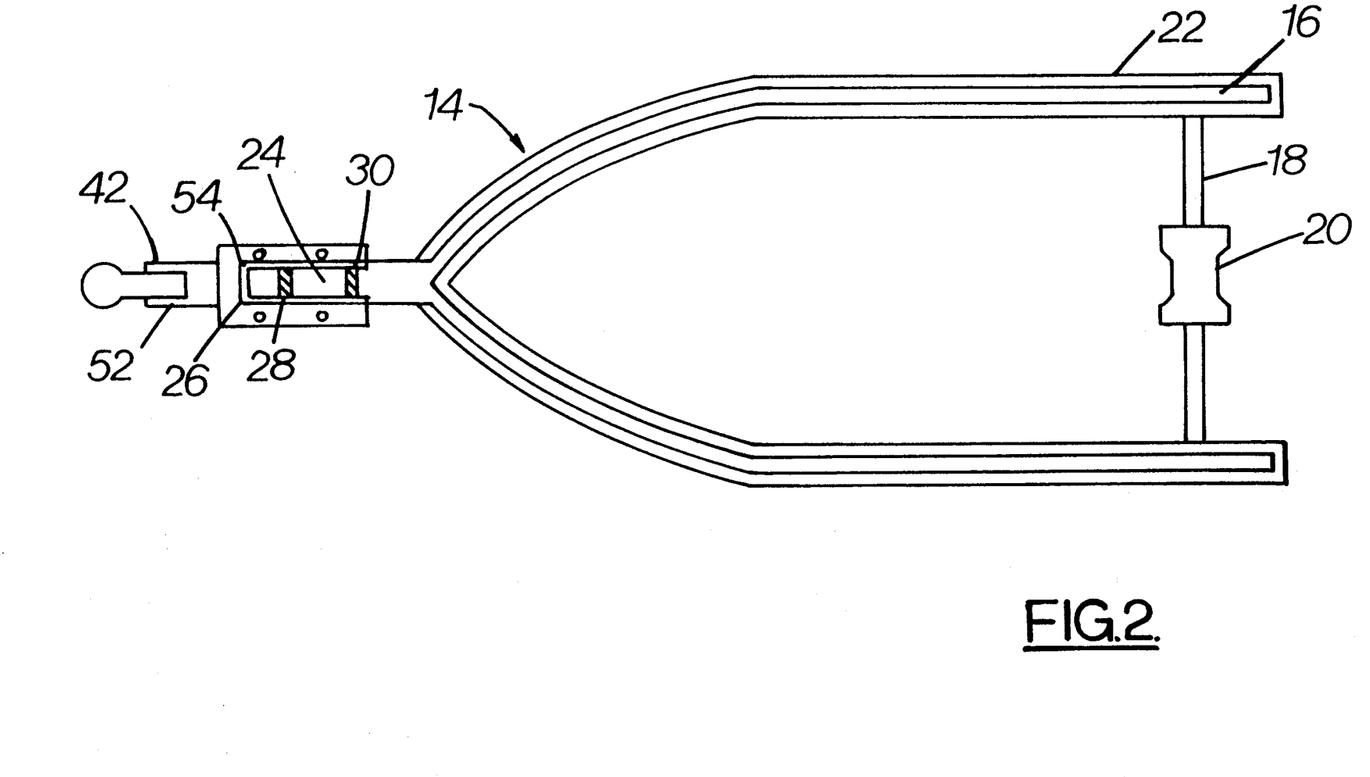
FIG. 2 is a top view of the combination depicted in FIG. 1 without the boat or the trailer.
Figure 3:
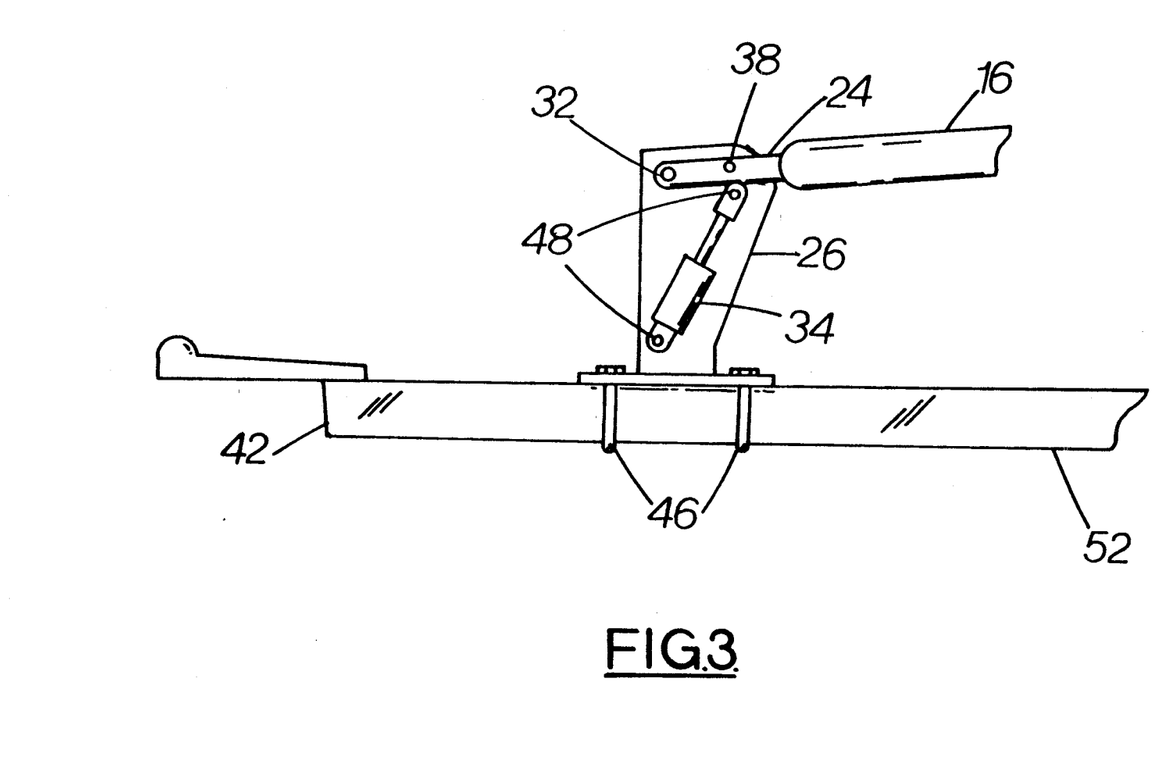
FIG. 3 is an exposed side view of a winch stand modified for mounting to the present invention with a gas cylinder and associated boat guide rail illustrated in an up position.
Figure 4:
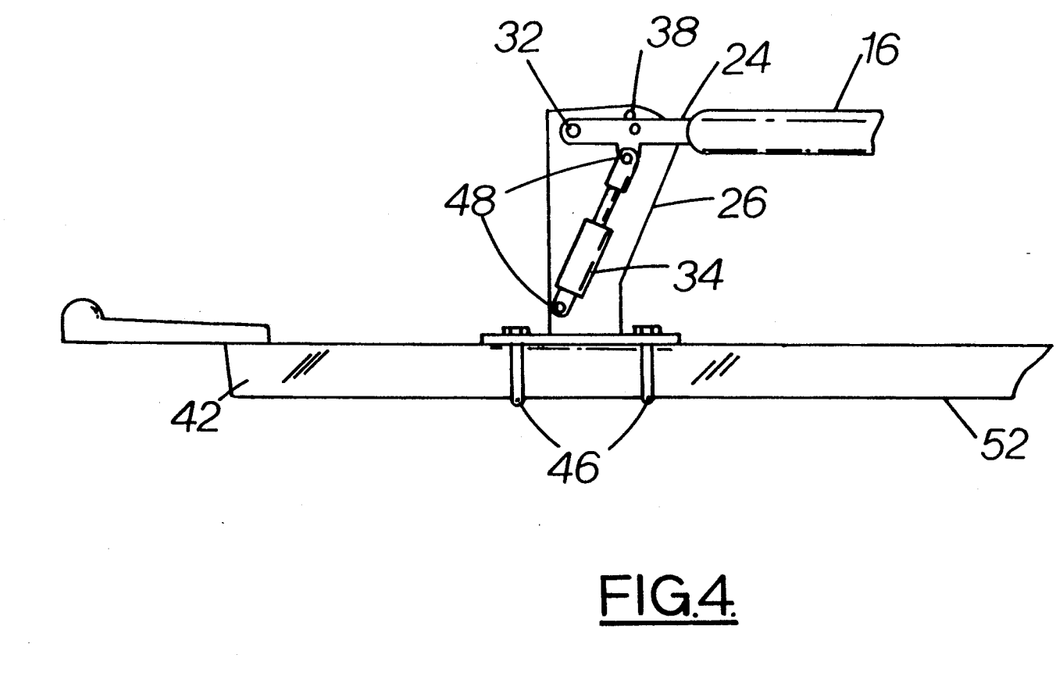
FIG. 4 is another exposed side view of the modified winch stand depicted in FIG. 3 with the gas cylinder and associated boat guide rail illustrated in a down position.
Figure 5:
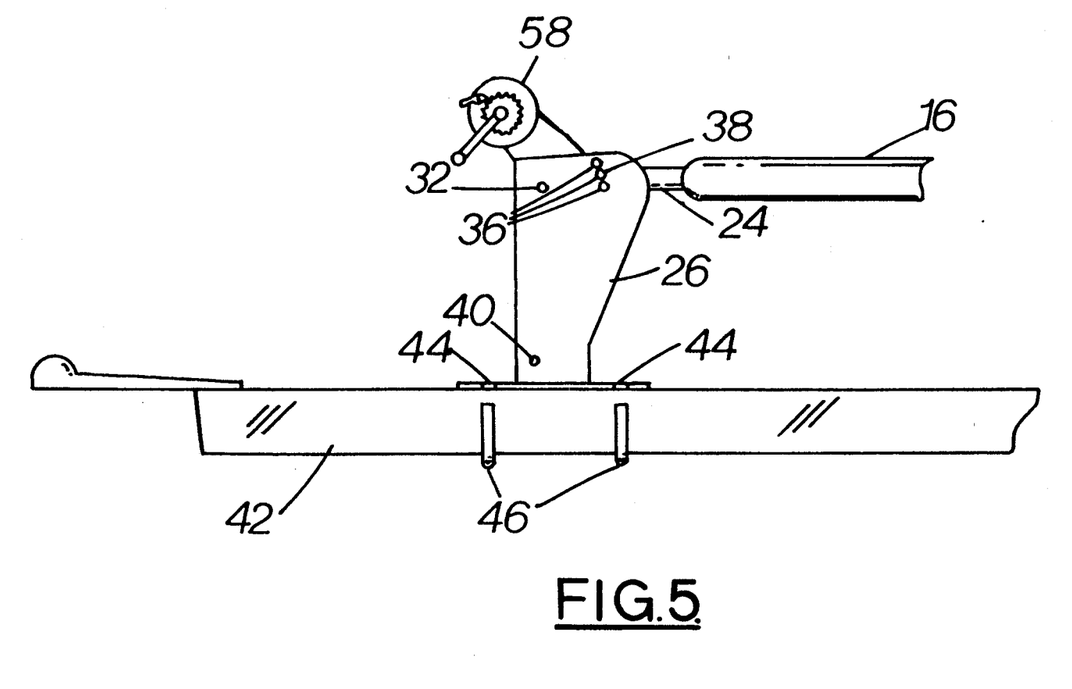
FIG. 5 is another partial side view of the modified winch stand depicted in FIGS. 3 and 4 with the elevating mechanism removed.

Mounting pins 48 or other fasteners attach the elevating device, i.e., the gas cylinder 34, to the mounting bracket or mounting base 26. A conventional winch may be fastened to the base member 26. It is envisioned that when the installing the guide rail and elevating mechanism of the present invention on a conventional trailer that the winch be removed from the trailer and replaced on the base 26. This is depicted schematically in FIG. 5.

It is not intended that the guide rail 16 actually lift the boat or support the boat. Similarly, the weight of the boat being launched or docked is intended to overcome the lift of the elevating means as the weight of the boat bears upon the supporting roller and the guide rails 16. Therefore, the weight of the boat will lower the guide rail 16. In a preferred embodiment the guide rail may be manually lowered.

In order to facilitate retrofit of the present invention to conventional trailers, the modified winch stand or mounting base 26 can be attached to a tongue member 42 of the boat trailer through appropriate fastening receiving openings 44 with U-bolts 46 or their equivalents.

The modified winch stand and mounting base 26 is generally U-shaped in order to receive the mounting bracket 24 intermediate generally parallel side members 54.

A pivot pin supporting bore 28 is defined by the opposing parallel sides 54 of the winch stand 26. The pivot pin support bores are lined up with a corresponding opening defined by the mounting bracket 24 and a suitable pivot pin is inserted. The pivot pin arrangement provided by the present invention allows vertical movement of the guide rail and elevating means assembly 14 while at the same time limiting horizontal or lateral movement of the boat.

Adjustment pin receiving bores 36 are defined by the side members 54 of the winch stand and mounting base 26. Vertical movement of the guide rails 16 is adjustable by placing a limiting pin through a pair of opposing bores. Elevation of the mounting bracket 24 will be limited by a suitable pin placed in a pair of the opposing bores. A clevis pin, hasp or other suitable fastener may be used. The pin so installed prevents the elevating device from raising the guide rails higher than desired.

It will be understood that this feature will allow the present invention to be used on boat ramps of varying degrees of slope. If the guide rails 16 were allowed to raise too high, then the boat may not float out between the guide rails when the boat ramp slope does not have an adequate slope. A plurality of adjustment bores 38 provide for additional adjustment to take into account the different inclinations of the various boat ramps.

From the foregoing description those skilled in the art will appreciate that all of the objects of the present invention are realized. A self-elevating boat launching and docking guide rail for trailers has been shown and described for providing an improved self-elevating boat launching and docking guide rail that is attached to a trailer but can be raised and lowered independent of the trailer.

The present invention provides for a construction that raises above, yet not completely, out of the water when the trailer is backed into the water and lowers when the trailer or the trailer and boat are pulled from the water by a vehicle. The present invention provides for alignment of the boat with the trailer so as to prevent the stern of the boat from drifting during the loading and unloading procedure. It is further intended that this invention be of assistance to a single person faced with the task of either loading or unloading a boat from a trailer.

The improved self-elevating boat launching and docking guide rail of the present invention may be used in association with conventional boat trailers. The present invention is provided in the general shape of a boat and can be mounted on suitable conventional boat trailers by replacing an existing winch stand with a modified winch stand constructed in accordance with this invention.

While specific embodiments have been shown and described, many variations are possible. The particular style, shape and type of guide rails may vary, and the particular type of lifting device may be altered or changed to suit the particular guide rail and other equipment used. It will be understood that other lifting devices may be substituted such as springs, motors, gears or manual methods.

Having described the invention in detail, those skilled in the art will appreciate that modifications may be made of the invention without departing from its spirit. Therefore, it is not intended that the scope of the invention be limited to the specific embodiments illustrated and described. Rather, it is intended that the scope of this invention be determined by the appended claims and their equivalents.

What is claimed is:

1. A guide rail and elevating apparatus, comprising:
   means for defining a structure for receiving a boat during a launching or a docking maneuver, the structure providing alignment means for the boat with respect to a trailer for receiving the boat during launching or docking of the boat, the structure including opposing side members extending from a closed end to an open end and a cross member, the cross member including a keel receiving portion which extends between and below the side members;
   elevating means associated with the structure for mechanical elevation of the stern end of the structure about a pivot means, the location of the pivot means at the bow receiving end; and
   mounting means for the elevating means and the structure having said pivot means.

2. A guide rail and elevating apparatus as set forth in claim 1 wherein the structure includes a guide rail member having a generally open end for docking a boat of from which to launch a boat.

3. A guide rail and elevating apparatus as set forth in claim 1 wherein the mounting means includes prop means attached to a conventional boat trailer.

4. A guide rail and elevating mechanism as set forth in claim 3 wherein the prop means provides a base for a conventional boat trailer winch.

5. A guide rail and elevating mechanism for use in association with a conventional boat trailer, comprising:
   a guide rail assembly for providing and maintaining a floating boat in a desired general alignment with a conventional boat trailer during boat launching and docking with the trailer, the guide rail assembly including opposing side members extending from a closed end to an open end;
   a mounting bracket associated with the guide rail assembly, the mounting bracket comprising a mounting stand attached to the boat trailer;
   means for connecting the guide rail assembly to the mounting stand to provide a pivot point between the mounting stand and the guide rail assembly; and
   a lifting device carried by the mounting stand and operatively connected to the guide rail assembly providing mechanical elevation of the stern end of the guide rail assembly about the pivot point.

6. A guide rail and elevating mechanism as set forth in claim 5 wherein means for providing boat support during launching is associated with the guide rail assembly.

7. A guide rail and elevating assembly as set forth in claim 6 wherein the boat support is a roller support.

8. A guide rail and elevating assembly as set forth in claim 7 wherein an arched member extends intermediate opposing guide rail members and provides support for the roller.

9. A guide rail and elevating assembly as set forth in claim 8 wherein the arched member shape generally conforms to the shape of the boat hull or keel portion.

10. A guide rail and elevating assembly as set forth in claim 5 wherein guide rail assembly is comprised of aluminum tubing.

11. A guide rail and elevating assembly as set forth in claim 5 further comprising a protective cover member supported by the guide rail and converting the bottom of the boat as the boat is trailered, launched, or docked.

12. A guide rail and elevating mechanism as set forth in claim 5 wherein an adjustment means limits the extend to which the assembly is elevated.

13. A guide rail and elevating assembly as set forth in claim 12 wherein the adjustment means is provided by a plurality of discrete bores defined by the mounting bracket and including a pin for insertion into one of the said bores, wherein the pin limits movement of the lifting device and the guide rail assembly.

14. A guide rail and elevating device as set forth in claim 5 wherein the lifting device is a gas charged cylinder.

15. A guide rail and elevating assembly as set forth in claim 5 wherein the lifting device is a bearing spring.

16. A guide rail and elevating assembly as set forth in claim 5 wherein the lifting device is manually operated.

* * * * *